US012088156B2

United States Patent
Wu et al.

(10) Patent No.: US 12,088,156 B2
(45) Date of Patent: Sep. 10, 2024

(54) ROTOR POSITION-BASED RAMP RATE TO REDUCE VEHICLE HARSHNESS DURING ACTIVE DISCHARGE

(71) Applicant: Ford Global Technologies, LLC, Dearborn, MI (US)

(72) Inventors: Ji Wu, Ann Arbor, MI (US); Michael W. Degner, Novi, MI (US); Wei Wu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 156 days.

(21) Appl. No.: 17/851,963

(22) Filed: Jun. 28, 2022

(65) Prior Publication Data

US 2023/0421027 A1 Dec. 28, 2023

(51) Int. Cl.
| | |
|---|---|
| *G01R 31/327* | (2006.01) |
| *H02K 11/38* | (2016.01) |
| *H02P 21/00* | (2016.01) |
| *H02P 27/00* | (2006.01) |

(52) U.S. Cl.
CPC .............. *H02K 11/38* (2016.01); *H02P 21/00* (2013.01); *H02P 27/00* (2013.01); *H02K 2213/03* (2013.01)

(58) Field of Classification Search
CPC .......... H02P 21/00; H02P 27/00; H02P 23/16; G01R 31/3271
See application file for complete search history.

(56) References Cited

U.S. PATENT DOCUMENTS

| | | | |
|---|---|---|---|
| 8,810,177 B2 | 8/2014 | Schulz | |
| 9,007,004 B2 | 4/2015 | Hunter | |
| 9,673,743 B1 | 6/2017 | Billson et al. | |
| 9,742,333 B2 | 8/2017 | Amemiya et al. | |
| 2014/0210391 A1 | 7/2014 | Bozic et al. | |
| 2014/0253003 A1* | 9/2014 | Uchida | H02P 23/16 |
| | | | 318/400.17 |
| 2018/0105059 A1* | 4/2018 | Namou | G01R 31/3271 |

FOREIGN PATENT DOCUMENTS

| | | |
|---|---|---|
| JP | 2013-192399 A | 9/2013 |
| JP | 2016-226268 A | 12/2016 |

* cited by examiner

*Primary Examiner* — Cortez M Cook
(74) *Attorney, Agent, or Firm* — David B. Kelley; Brooks Kushman P.C.

(57) ABSTRACT

A controller, responsive to a signal indicating deactivation of a vehicle and disconnection of a traction battery from an inverter, generates a d-axis current command for the inverter having a ramp portion that defines a rate of change in current magnitude that depends on an electric angle between a rotor and stator of an electric machine.

17 Claims, 5 Drawing Sheets

ROTOR POSITION-BASED RAMP RATE TO REDUCE VEHICLE HARSHNESS DURING ACTIVE DISCHARGE

TECHNICAL FIELD

This disclosure relates to automotive power systems.

BACKGROUND

Vehicles (e.g., automotive vehicles) may be propelled by operation of one or more electric machines. These electric machines may receive energy from, or provide energy to, a traction battery or other energy storage device.

SUMMARY

A vehicle has an electric machine including a rotor and stator, an inverter, and a controller that, responsive to a signal indicating deactivation of the vehicle, generates a d-axis current command for the inverter having a ramp portion that defines a rate of change in current magnitude that depends on an electric angle between the rotor and stator. The vehicle may include a traction battery. The controller may further generate the d-axis current command responsive to the signal further indicating the traction battery has been disconnected from the inverter. The inverter may include a DC bus capacitor and the d-axis current command may result in discharge of the DC bus capacitor to the electric machine. The rate of change may increase as values of the electric angle increase for certain ranges of values of the electric angle. The rate of change may decrease as values of the electric angle increase for other ranges of values of the electric angle. The rate of change may remain constant as values of the electric angle increase for still other ranges of values of the electric angle.

A method includes, responsive to a signal indicating a traction battery has been disconnected from an inverter, generating a d-axis current command for the inverter having a ramp portion that defines a rate of change in current magnitude that depends on an electric angle between a rotor and stator of an electric machine. The generating may further be responsive to the signal indicating deactivation of a vehicle. The generating may result in discharge of a DC bus capacitor. The rate of change may increase as values of the electric angle increase for certain ranges of values of the electric angle. The rate of change may decrease as values of the electric angle increase for other ranges of values of the electric angle. The rate of change may remain constant as values of the electric angle increase for still other ranges of values of the electric angle.

A power system for a vehicle includes a controller that, responsive to a first signal indicating a first deactivation of the vehicle and disconnection of a traction battery from an inverter, generates a first d-axis current command for the inverter having a first ramp portion that defines a first rate of change in current magnitude, and responsive to a second signal indicating a second deactivation of the vehicle and disconnection of the traction battery from the inverter, generates a second d-axis current command for the inverter having a second ramp portion that defines a second rate of change in current magnitude different than the first rate of change in current magnitude. The first and second d-axis current commands may result in discharge of a DC bus capacitor to an electric machine. The first and second rates of change may be a function of an electric angle between a rotor and stator of an electric machine. The first and second rates of change may be a function of the electric angle such that the first and second rates of change increase as values of the electric angle increase for certain ranges of values of the electric angle. The first and second rates of change may be a function of the electric angle such that the first and second rates of change decrease as values of the electric angle increase for other ranges of values of the electric angle. The first and second rates of change may be a function of the electric angle such that the first and second rates of change remain constant as values of the electric angle increase for still other ranges of values of the electric angle. The vehicle may be an automotive vehicle.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric vehicles are propelled by a DC high-voltage (HV) battery supplying power to an AC permanent magnet electric motor. An inverter is used to convert the DC power into AC power. A DC bus capacitor connected between positive and negative HV buses may be discharged by applying current on a d-axis of the motor after the vehicle is parked. The DC bus capacitor may acquire charge during normal vehicle operation. Thus, after the vehicle is deactivated and the DC HV battery is disconnected from the inverter, steps may be taken to discharge the DC bus capacitor. In theory, a pure d-axis current (id) in a permanent magnet motor and a zero q-axis current (iq) does not produce torque. Multiple reasons, however, could make the motor produce torque during this process, such as dwell time effects or current control accuracy. This torque could transfer to a movement of the vehicle or a noise/harshness feeling to the driver.

Figure 1:
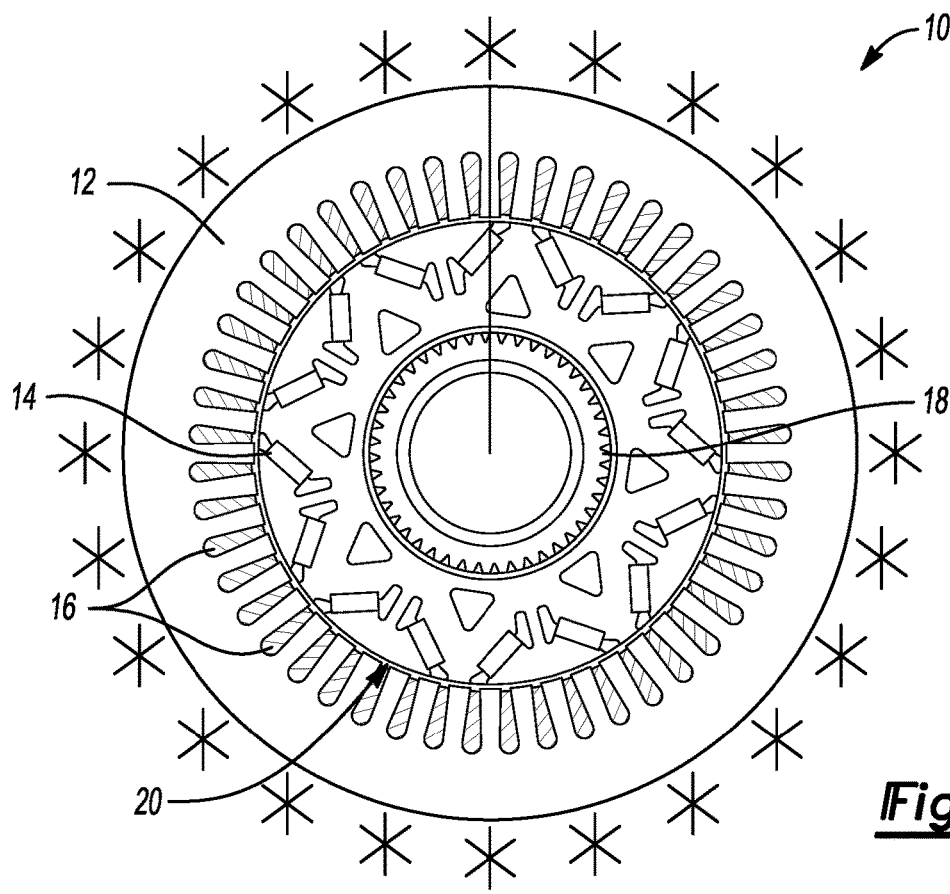
FIG. 1 is a plan view of a portion of an electric machine.

Referring to FIG. 1, an electric machine 10 includes a stator 12, a rotor 14, windings 16, and a shaft 18. The stator 12 surrounds and is spaced away from the rotor 14 to define an airgap 20, and provides a stationary electromagnetic machine portion. The rotor 14 surrounds the shaft 18 and provides a rotating electromagnetic machine portion. The windings 16 are wound within teeth of the stator 12 and provide AC electrical power input/output. The shaft 18 provides rotating mechanical power input/output. In each electrical cycle with a phase number of X (typically 3 but not limited to 3) and a pole pair number of P, there are 2XP rotor positions that produce zero phase current on one of the X phases when a pure d-axis current is commanded. For example, a 4 pole pair 3 phase machine would have the possible rotor positions shown that may incur zero phase current.

The stator 12 and rotor 14 each have a line drawn thereon. The lines, in this example, are vertical and aligned. This represents a 0° electric angle between the stator 12 and rotor 14. As the rotor 14 rotates relative to the stator 12, its line rotates therewith. When the rotor 14 is positioned such that its line is located at the 3 o'clock position, this represents a 90° electric angle between the stator 12 and rotor 14. When the rotor 14 is positioned such that its line is located at the 9 o'clock position, this represents a 270° electric angle between the stator 12 and rotor 14, etc.

Figure 3:
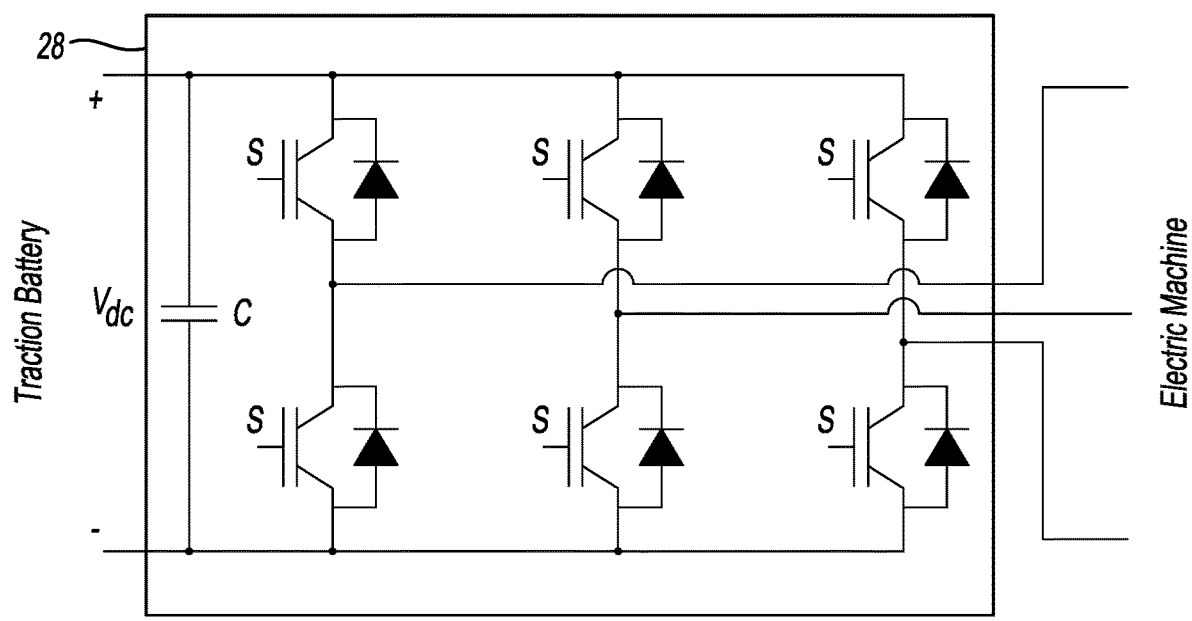
FIG. 3 is a schematic diagram of the inverter of FIG. 2.
Figure 2:
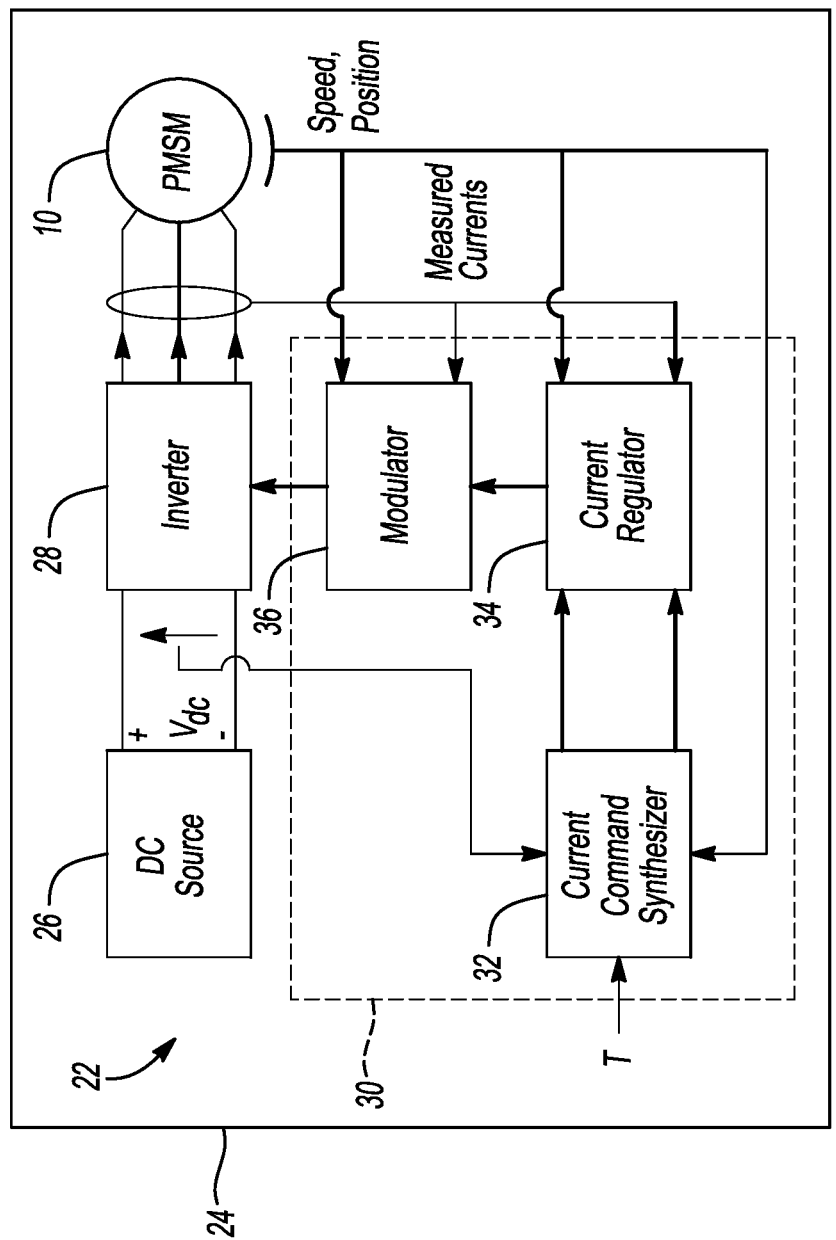
FIG. 2 is a block diagram of a control architecture for a vehicle power system that includes the electric machine of FIG. 1.
Figure 4A:
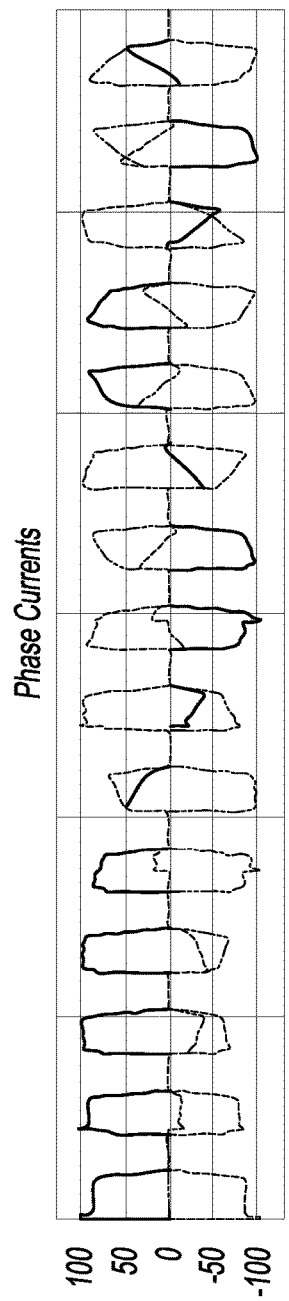
FIG. 4A is a plot of phase currents versus time.
Figure 4B:
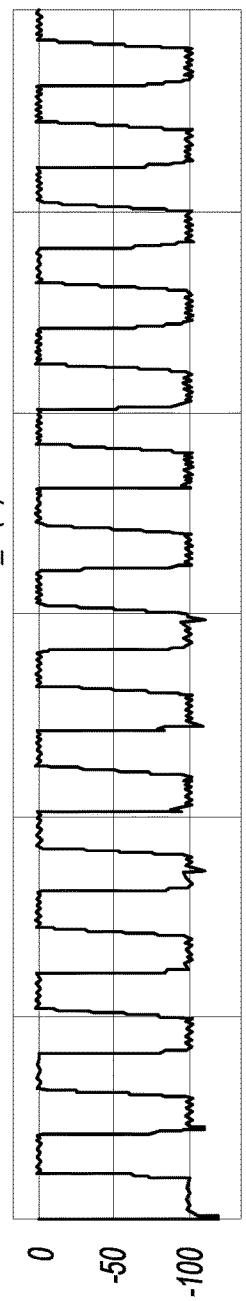
FIG. 4B is a plot of d-axis current versus time.
Figure 4C:
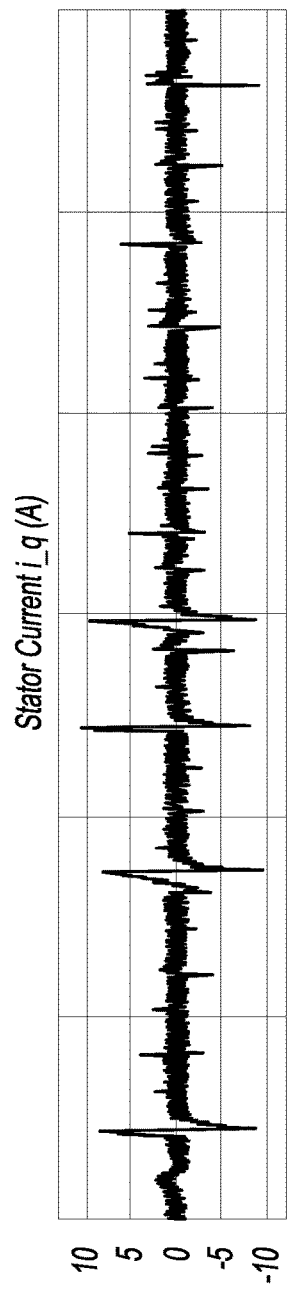
FIG. 4C is a plot of q-axis current versus time.
Figure 4D:
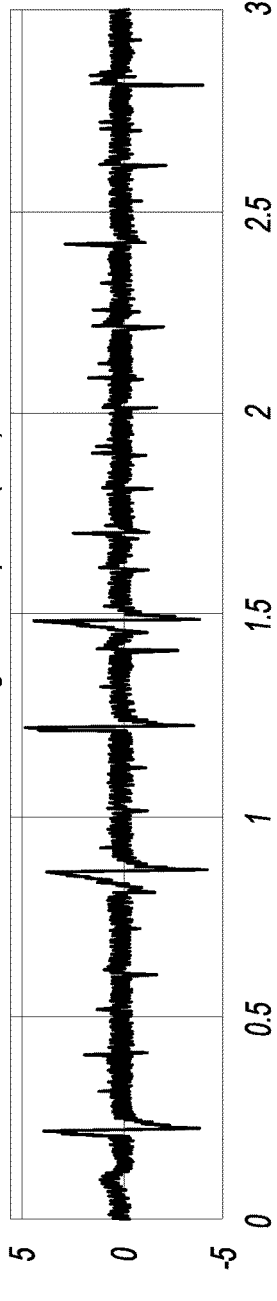
FIG. 4D is a plot of torque versus time.

Referring to FIGS. 2 and 3, a power system 22 for a vehicle 24 includes a traction battery 26, an inverter 28, the electric machine 10, and a controller 30. The inverter 28 includes a plurality of switches S and a capacitor C as usual. The controller 30 includes a current command synthesizer 32, a current regulator 34, and a modulator 36. The inverter 28, when connected, is electrically between the traction battery 26 and electric machine 10. The traction battery 26 is a DC source. The output voltage of the traction battery 26 is the supply voltage for the inverter 28. AC terminals of the inverter 28 are electrically connected to the electric machine 10.

In certain circumstances, the electric machine 10 can be controlled in such a way that electromagnetic torque produced by the electric machine 10 is roughly equal to a torque command, T. Based on the torque command T, the output voltage of the traction battery 26, and a speed of the rotor 14, the current command synthesizer 32 may determine a desired value of d-axis and q-axis currents that will achieve the control objective (e.g., an actual torque equal to the torque command) while ensuring other operating constraints are met (e.g., the RMS phase current is less than a predefined limit defined by the electric machine 10, the RMS phase voltage is less than or equal to that permitted by the DC rail voltage, the d-axis current is negative, etc.).

The current regulator 34 operates to drive the actual d-axis and q-axis currents toward the commanded values. Inputs to the current regulator 34 can include the d-axis and q-axis current commands, the measured phase currents, and the position and speed of the rotor 14. Depending on configuration, the current regulator 34 may either generate a phase variable current command or phase variable voltage command to the modulator 36. The modulator 36 will, in turn, generate gate signals for switches of the inverter 28.

From a motor control perspective, when a phase current is close to zero, it may be difficult to precisely control the current due to the inverter dwell time effects. This could produce a q-axis current which in turn produces torque. Referring to FIGS. 4A-4D, a d-axis current is being commanded at various rotor positions, resulting in a non-zero q-axis current and non-zero torque at those positions affected by dwell time effects.

For reference, torque produced by a permanent magnet electric machine can be represented by equation (1), where p is the pole pair number, $\lambda_f$ is the permanent magnetic flux linkage, and $L_d$ and $L_q$ are the d and q axis inductances:

$$3/2 \cdot p \cdot [\lambda_f + (L_d - L_q) \cdot i_d] \cdot i_q \qquad (1)$$

Figure 5:
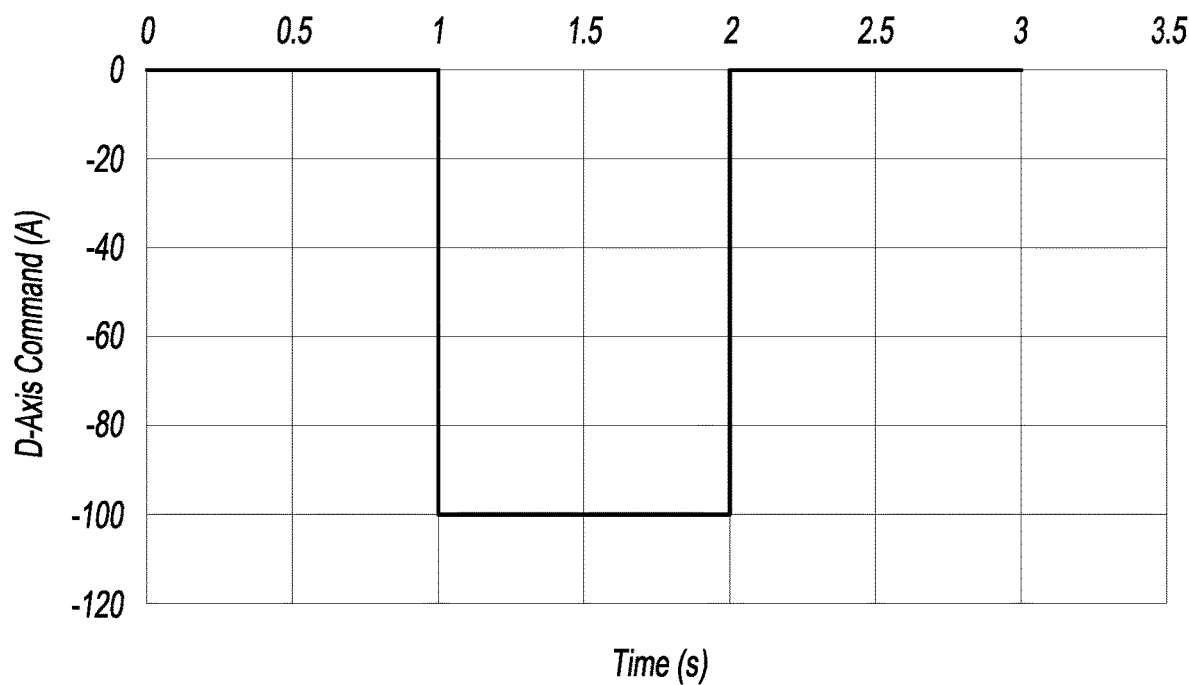
FIG. 5 is a plot of a typical d-axis current command versus time.

Referring to FIG. 5, a typical controller commands d-axis current from zero to a target value instantly, which can lead to undesirable transient torques as mentioned above.

Figure 6:
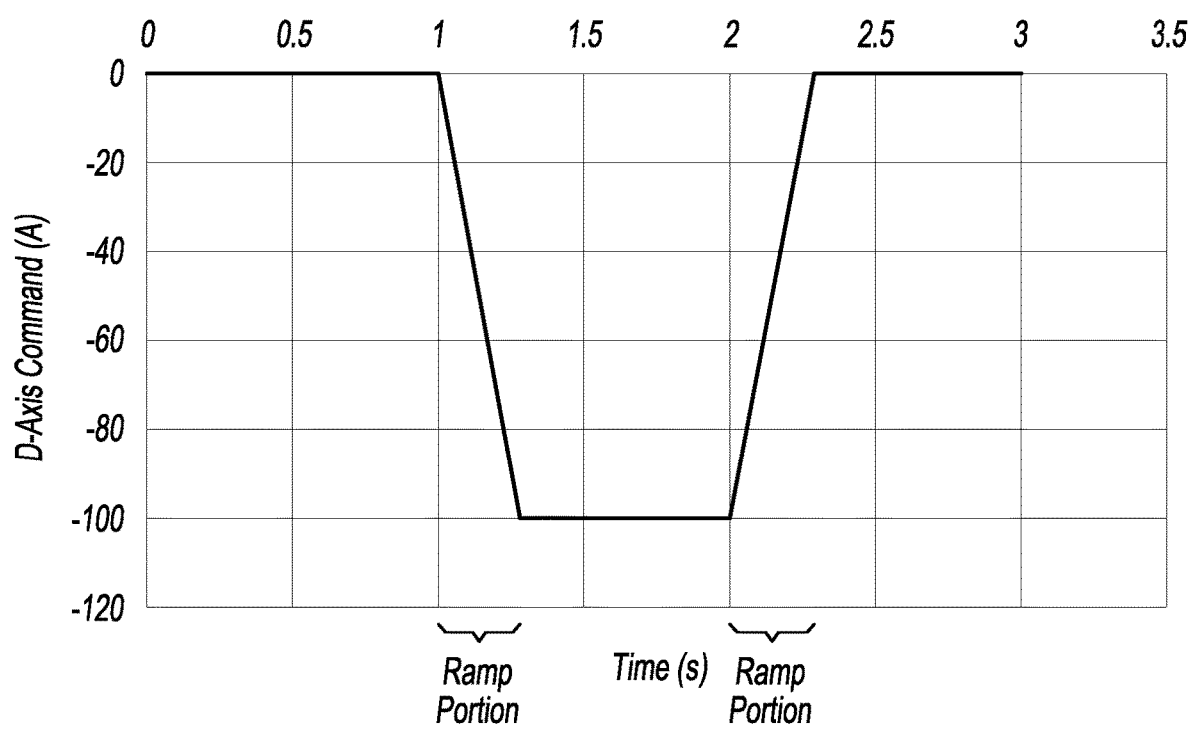
FIG. 6 is a plot of a d-axis current command versus time.

Referring to FIG. 6, a d-axis current command can include ramp portions that reduce the effect of dwell time by reducing the d-axis current magnitude during the ramping phase, resulting in less torque production by the electric machine 10. A ramp rate is thus defined by a change of current magnitude from, in this example, zero to a maximum value (or vice versa) in a set amount of time, such as A/s. By knowing what rotor angles can incur zero phase current/ dwell time effects as described above, the controller 30 can proactively change the ramp rate when the rotor angle is close to problematic angles. That is, the ramp rate associated with ramp portions of the d-axis current command will be defined by the electric angle between the rotor 12 and stator 14. The ramp rate may thus be greater when the electric angle has certain values as compared with other values. And, d-axis current commands generated after vehicle deactivations may have different ramp rates as the electric angle may be different.

Figure 7:
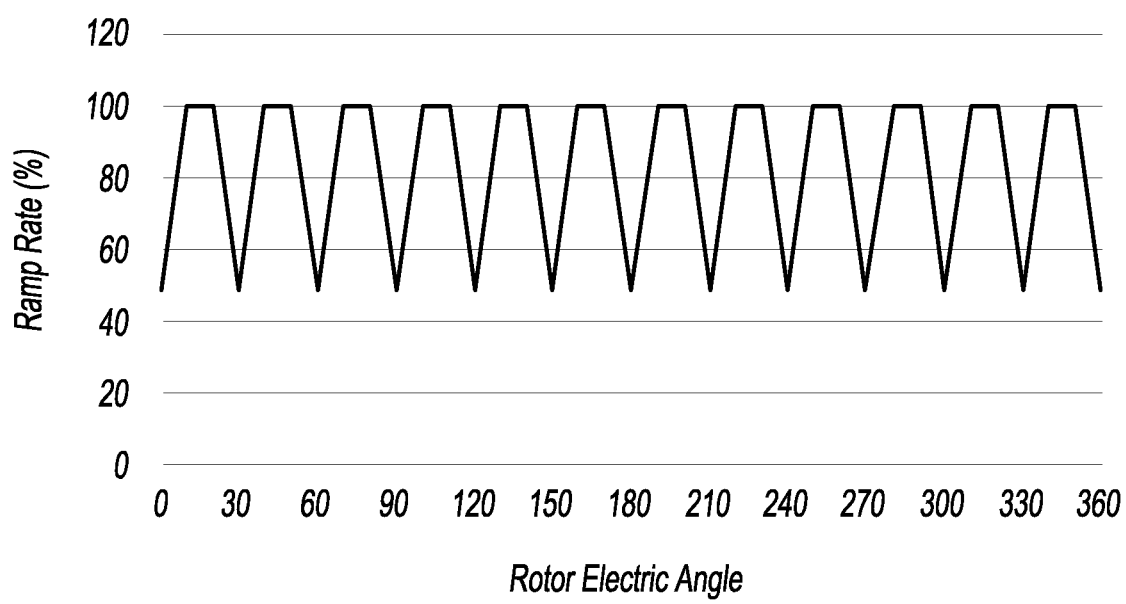
FIG. 7 is a plot of ramp rate percentage for a d-axis current command versus rotor electric angle.

Referring to FIG. 7, an example of ramp rate percentage being a function of rotor electric angle is shown. A minimum rate of change (or slope) for the ramp rate corresponds to 0% and a maximum rate of change corresponds to 100%. The minimum and maximum rates of change are application specific and can be determined via simulation or testing. A ramp rate percentage half-way between 0% and 100% (i.e., 50%) represents a slope for the ramp rate that is half-way between the minimum and maximum slopes. The trace in this example shows at which ranges of electric angles the ramp rate increases as the electric angle increases, decreases as the electric angle increases, and remains constant as the electric angle increases. The periodicity of the trace may depend on the number of rotor positions that produce zero phase current on one of the X phases when a pure d-axis current is commanded. Different shapes may also be implemented to have similar effect. The bottom of the ramp rate percentage, for example, may be flat so that adjacent rotor positions will share the same ramp rate, etc.

Referring to FIGS. 2 and 7, responsive to the controller 30 receiving signals in conventional fashion indicating the vehicle 24 has been deactivated (e.g., key off), the traction battery 26 has been disconnected from the inverter 28, and a value for the electric angle between the stator 12 and rotor 14, the controller 30 may consult a look-up table or the like capturing the ramp rate percentage versus rotor electric angle relationship shown in FIG. 7. If, for example, the value for the electric angle is 0°, the controller 30 may set the ramp rate at half-way between the minimum and maximum slopes as the ramp rate percentage at 0° electric angle is 50%. If, for example, the value for the electric angle is 45°, the controller 30 may set the ramp rate at the maximum slope as the ramp rate percentage at 45° electric angle is 100%. Once the controller 30 has selected the ramp rate for the ramp portions, it my generate the d-axis current command accordingly such that energy stored by the DC bus capacitor C is dissipated via the electric machine 30.

Certain techniques contemplated herein were simulated for a particular rotor electric angle. Discharging the simulated DC bus capacitor using a d-axis current command similar to FIG. 5, the simulated electric machine exhibited a 14 Nm peak torque and 19 RPM speed. Discharging the simulated DC bus capacitor using a d-axis current command similar to FIG. 6, the simulated electric machine exhibited a 6 Nm peak torque and 13 RPM speed.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words 'controller' and 'controllers,' for example, can be used interchangeably.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine including a rotor and stator;
   an inverter; and
   a controller programmed to, responsive to a signal indicating deactivation of the vehicle, generate a d-axis current command for the inverter having a ramp portion that defines a rate of change in current magnitude that depends on an electric angle between the rotor and stator, wherein the rate of change increases as values of the electric angle increase for certain ranges of values of the electric angle.

2. The vehicle of claim 1 further comprising a traction battery, wherein the controller is further programmed to generate the d-axis current command responsive to the signal further indicating the traction battery has been disconnected from the inverter.

3. The vehicle of claim 1, wherein the inverter includes a DC bus capacitor and wherein the d-axis current command results in discharge of the DC bus capacitor to the electric machine.

4. The vehicle of claim 1, wherein the rate of change decreases as values of the electric angle increase for other ranges of values of the electric angle.

5. The vehicle of claim 1, wherein the rate of change remains constant as values of the electric angle increase for still other ranges of values of the electric angle.

6. A method comprising:
   responsive to a signal indicating a traction battery has been disconnected from an inverter, generating a d-axis current command for the inverter having a ramp portion that defines a rate of change in current magnitude that depends on an electric angle between a rotor and stator of an electric machine, wherein the rate of change increases as values of the electric angle increase for certain ranges of values of the electric angle.

7. The method of claim 6, wherein the generating is further responsive to the signal indicating deactivation of a vehicle.

8. The method of claim 6, wherein the generating results in discharge of a DC bus capacitor.

9. The method of claim 6, wherein the rate of change decreases as values of the electric angle increase for other ranges of values of the electric angle.

10. The method of claim 6, wherein the rate of change remains constant as values of the electric angle increase for still other ranges of values of the electric angle.

11. A power system for a vehicle comprising:
    a controller programmed to,
      responsive to a first signal indicating a first deactivation of the vehicle and disconnection of a traction battery from an inverter, generate a first d-axis current command for the inverter having a first ramp portion that defines a first rate of change in current magnitude, and
      responsive to a second signal indicating a second deactivation of the vehicle and disconnection of the traction battery from the inverter, generate a second d-axis current command for the inverter having a second ramp portion that defines a second rate of change in current magnitude different than the first rate of change in current magnitude.

12. The power system of claim 11, wherein the first and second d-axis current commands result in discharge of a DC bus capacitor to an electric machine.

13. The power system of claim 11, wherein the first and second rates of change are a function of an electric angle between a rotor and stator of an electric machine.

14. The power system of claim 13, wherein the first and second rates of change are a function of the electric angle such that the first and second rates of change increase as values of the electric angle increase for certain ranges of values of the electric angle.

15. The power system of claim 14, wherein the first and second rates of change are a function of the electric angle such that the first and second rates of change decrease as values of the electric angle increase for other ranges of values of the electric angle.

16. The power system of claim 15, wherein the first and second rates of change are a function of the electric angle such that the first and second rates of change remain constant as values of the electric angle increase for still other ranges of values of the electric angle.

17. The power system of claim 11, wherein the vehicle is an automotive vehicle.

* * * * *